United States Patent [19]

Körner et al.

[11] Patent Number: 5,709,594
[45] Date of Patent: Jan. 20, 1998

[54] PORTABLE MOTOR OR ENGINE-DRIVEN CUTTING-OFF MACHINE

[75] Inventors: Hans-Jürgen Körner, Lüneburg; Wolfgang Jaensch, Tremsbüttel, both of Germany

[73] Assignee: Dolmar GmbH, Hamburg, Germany

[21] Appl. No.: 761,683

[22] Filed: Dec. 6, 1996

Related U.S. Application Data

[63] Continuation of Ser. No. 510,982, Aug. 3, 1995, abandoned.

[30] Foreign Application Priority Data

Aug. 4, 1994 [DE] Germany ............... 9412558 U

[51] Int. Cl.⁶ .................................................. B24B 47/02
[52] U.S. Cl. .................... 451/344; 451/311; 451/358; 474/112
[58] Field of Search .......................... 451/311, 358, 451/344; 474/112

[56] References Cited

U.S. PATENT DOCUMENTS

| | | | |
|---|---|---|---|
| 3,606,707 | 9/1971 | Naslund | 451/344 |
| 3,623,378 | 11/1971 | Stanford | 474/133 |
| 3,893,240 | 7/1975 | Morner et al. | 451/358 |
| 3,965,768 | 6/1976 | Foster | 474/135 |
| 4,500,303 | 2/1985 | Sermersheim et al. | 474/112 |
| 4,781,665 | 11/1988 | Walker | 474/133 |

FOREIGN PATENT DOCUMENTS

| | | |
|---|---|---|
| 24 27 356 | 1/1975 | Germany . |
| 3444116 A1 | 6/1986 | Germany . |
| 3841644 A1 | 6/1990 | Germany . |
| 9005339.7 | 8/1990 | Germany . |
| 4136524 A1 | 5/1992 | Germany . |
| 4241767 C1 | 12/1993 | Germany . |

*Primary Examiner*—James G. Smith
*Assistant Examiner*—George Nguyen
*Attorney, Agent, or Firm*—Townsend and Townsend and Crew LLP

[57] ABSTRACT

In order to develop further a portable motor or engine-driven cutting-off machine with a housing (100) and an arm (12) connected thereto, on which a parting-off tool (22) is detachably secured, which can be driven with the aid of a traction means gearing (13, 14, 28) with a power transmission shaft (14) disposed on the arm (12) in such a way that, by means of simple constructional modifications, the rigidity between housing and arm is enhanced and their disadvantageous vibration behavior during cutting operations is improved, it is proposed that the arm (12) and the housing (100) or a housing half (11) be fabricated in a one-piece construction.

10 Claims, 2 Drawing Sheets

PORTABLE MOTOR OR ENGINE-DRIVEN CUTTING-OFF MACHINE

This is a Continuation of application Ser. No. 08/510,982, filed Aug. 3, 1995, now abandoned, the disclosure of which is incorporated by reference.

The invention relates to a portable motor or engine-driven cutting-off machine with a housing and an arm connected with it, on which a parting-off tool is detachably mounted, which can be driven by a traction means gearing with a power transmission shaft disposed on the arm.

BACKGROUND OF THE INVENTION

Cutting-off machines of the type stated are known e.g. as abrasive cutting-off machines or parting-off grinders which possess a cutting disk which is rigidly connected at the end of the arm to the transmission shaft. The arm is connected by means of a detachable connection with the housing of the cutting-off machine, wherein the electromotor or gasoline engine is accommodated as driving means of a drive shaft. A V-belt is placed upon and tightened over this drive shaft in the form of a first power transmission shaft and the further transmission shaft at the end of the arm, which drives the cutting disk or some other tool positioned there. When a V-belt replacement becomes necessary, the connection between the arm and the housing is detached. The arm, which is disposed so as to be displaceable with the aid of a slot guiding means, is displaced in the direction of the housing so that the new V-belt can be positioned over the two power transmission shafts. In the subsequent tightening operation, the arm is pushed forward again until the tension of the V-belt necessary for driving is reached. The arm has to be screwed down in this position on a housing or a housing extension while the traction force is maintained.

As a rule, the cutting disk is mounted centrally in relation to the longitudinal axis of the housing, whereby a favorable position of the center of gravity results which makes an optimal guidance of the cutting disk possible. However, it does become necessary now and then to dispose the cutting disk on the outside. In cutting-off machines known from the state of the art, this is managed by unscrewing the arm from the housing, turning it through 180° and, after a pertinent deposition of the V-belt, returning the arm into the tightening position. Following this, the cutting disk is located on the outside and can be employed in the cutting to length of parts which project from a wall and have to be cut off so as to be flush. Unfortunately, the changeover from the internal position to the external one involves a relatively great effort and calls for great skill and flexibility with regard to the adjustment of the tension on the V-belt.

Over and above that, the junction point between the arm and the housing represents a weak point which detracts from the rigidity of the cutting-off machine. Vibrations do disadvantageously arise frequently on the arm which are transmitted to the housing in such a way that the same co-vibrates with a continuous amplification intensification and makes the guiding of the machine more difficult in cutting-off operations.

That is why it is the technical problem of the present invention to develop the cutting-off machine referred to in the beginning further in such a way that, by means of simple constructional modifications, the rigidity between housing and arm is enhanced and the disadvantageous vibration behavior when cutting is improved.

SUMMARY OF THE INVENTION

The cutting-off machine of the present invention possesses an arm which is fabricated in one piece with the housing or a housing half. The advantages of the construction according to the invention reside in a significant reduction in the resulting vibrations or at least in a displacement of the vibrations into a less vaxatious higher frequency range. The rigidity is substantially enhanced due to the omission of the junction point between the arm and the housing. Likewise, owing to the omission of the connecting means between the arm and the housing, weight is saved and the number of the components is reduced.

Thus, for reasons related to manufacturing engineering and with a view to a considerable weight saving, the arm and the housing or a housing half are fabricated in the form of a single-piece metal or plastics component, preferably in the form of an injection-molded component.

The tightening means is by preference disposed in or on the arm, which, in comparison with being mounted in the housing interior, possesses the advantage that possibly necessary actuations of the tightening means, as become necessary when the traction means has to be replaced, are possible without the housing having to be screwed off. The tightening means is preferably acted upon by a spring force and is thus capable of automatically increasing the tension when the tension falls off in the tightening means. In a special embodiment of the invention, the tightening means is a roller acted upon by a spring force which is swivellable or linearily displaceable, an eccentric or a lever, preferably a toggle lever. The eccentric and cam tighteners or toggle lever tightening means have the advantage that a speedy bringing closer and withdrawal of the tightening means is possible, that they can be constructed so as to be self-locking and that, for the tightening, a smaller tightening force is required than in the case of tightening means involving bolts and nuts. The tightening means may act either indirectly upon the traction means or indirectly on the power transmission shaft secured to the arm. In the case of direct action upon the traction means, the tensioning means acts simultaneously as supporting roller, which possesses the advantage of a structurally simple design, but one which entails an additional rolling friction. The tightening means can be actuated electrically, hydraulically, pneumatically or manually, dependent in each case upon the type of motive drive of the cutting-off machine. In particular in a tightening device acting upon the transmission shaft, the tightening means is preferably floatingly supported and spring-cushioned such that vibrations which occur when the V-belt is in rotation, are not transmitted at all or are transmitted only in an attenuated fashion to the housing. In a specific embodiment, the tightening means is an eccentric which, with its eccentric curve on its casing side, acts upon a rocker arm rotatably supported on the arm, on whose free end a roller is disposed which acts upon a linearily displaceable power transmission shaft of the motive means. In order to make the tightening possible in this embodiment, the eccentric is impinged upon by the force of a spring acting in the tightening direction. If necessary, the eccentric may possess a locking pin which engages into a notch and retains the eccentric in a position against the spring force when the eccentric is rotated into a position in which the traction means is relaxed.

In order to achieve that the tightening of the traction means is reliably effected, the eccentric curve is designed in such a way that, with progressive tightening taking place, the tightening path brought about relative to the path of the tightening movement, becomes smaller. That is why provision is made for the eccentric curve to be configured in such a manner that, with a continuing elongation of the traction means, while taking into account the changing geometry of the traction means as well as the changing spring force acting upon the eccentric, a constant tension in the traction means is ensured and that the tightening means is secured against a return movement of the traction means by its geometry.

According to a further construction of the invention that facilitates the modification of the parting-off tool from the internal position to the external one, the transmission shaft on the free end of the arm is fitted with a central bore, into which a pin is optionally insertable and lockable from one or the other of the oppositely located flat face of the arm, in which case the pin is the carrier of the parting-off tool non-rotatably mounted on the same. This construction makes a speedy and simple-to-perform detachment of the pin possible, which is inserted in the desired position on the other side and is once more connected with the transmission shaft. By means of this stationary position of the arm, which is unchangeable in relation to the housing, it is thus not only possible to provide, in the arm or on the arm (or also within the housing), a fully automatic means for tightening the traction means, which can be retained when the parting-off tool is modified or converted or refitted so that neither a retightening of the traction means is necessary nor that a possibility of maladjustments exist.

The pin is preferably detachably secured in the bore of the transmission shaft by means of a frictional or rigid connection, more particularly by means of a non-rotationally symmetric or non-circular cross-sectional section or by means of a catch retained in a groove. By a non-circular cross-sectional section, any polygonal section may be understood, by way of example, possessing the form of a polygonal cross-sectional section or in the form of an oval, elongatedly circular or some other section. The pin may also be constructed on its external shell as a toothed section, in which case the teeth are fitted into matching recesses of the bore of the power transmission shaft. In the simplest case, the pin may possess a catch in the form of an elevated portion on the side of the shell which engages into a matching groove-like recess of the bore in the transmission shaft. The rigid connections between the pin and the transmission shaft, in comparison with the frictional connections, possess the advantage that a slipping through in the event of an inadequate attachment, as can occur in frictional connections, is avoided with certainty.

According to a further embodiment of the invention, the arm is disposed parallel to the longitudinal axis of the housing, preferably terminating flush with a lateral housing surface area or so as to project above the same. Due to the lateral disposition of the arm, it is possible to clamp the parting-off tool either centrally or in an oppositely located clamping position, in which the cutting movements can be executed along a wall or an edge.

Since, on account of the aforementioned reasons, the arm does not have to be detached from the motor or engine housing when the traction means is retightened, the parting-off tool is replaced or remounted or when the traction means is replaced, according to a further construction of the invention, a safety or protective hood, which partly covers the parting-off tool in the circumference side, is mounted on or at the arm, which is the carrier of the latter. For the sake of a constructionally simple design, the safety hood is detachably fitted to the arm and attached in a rotationally adjustable manner, more particularly with the aid of a snap-in disk or screw. This embodiment simplifies the handling when remounting the parting-off tool.

The parting-off tool is preferably a sawblade or a cutting disk and the traction means is a belt, preferably a V-belt or a chain.

BRIEF DESCRIPTION OF THE DRAWINGS

In the drawings, an embodiment example of the invention is depicted. Thus

DETAILED DESCRIPTION OF THE PREFERRED EMBODIMENT

Figure 1:
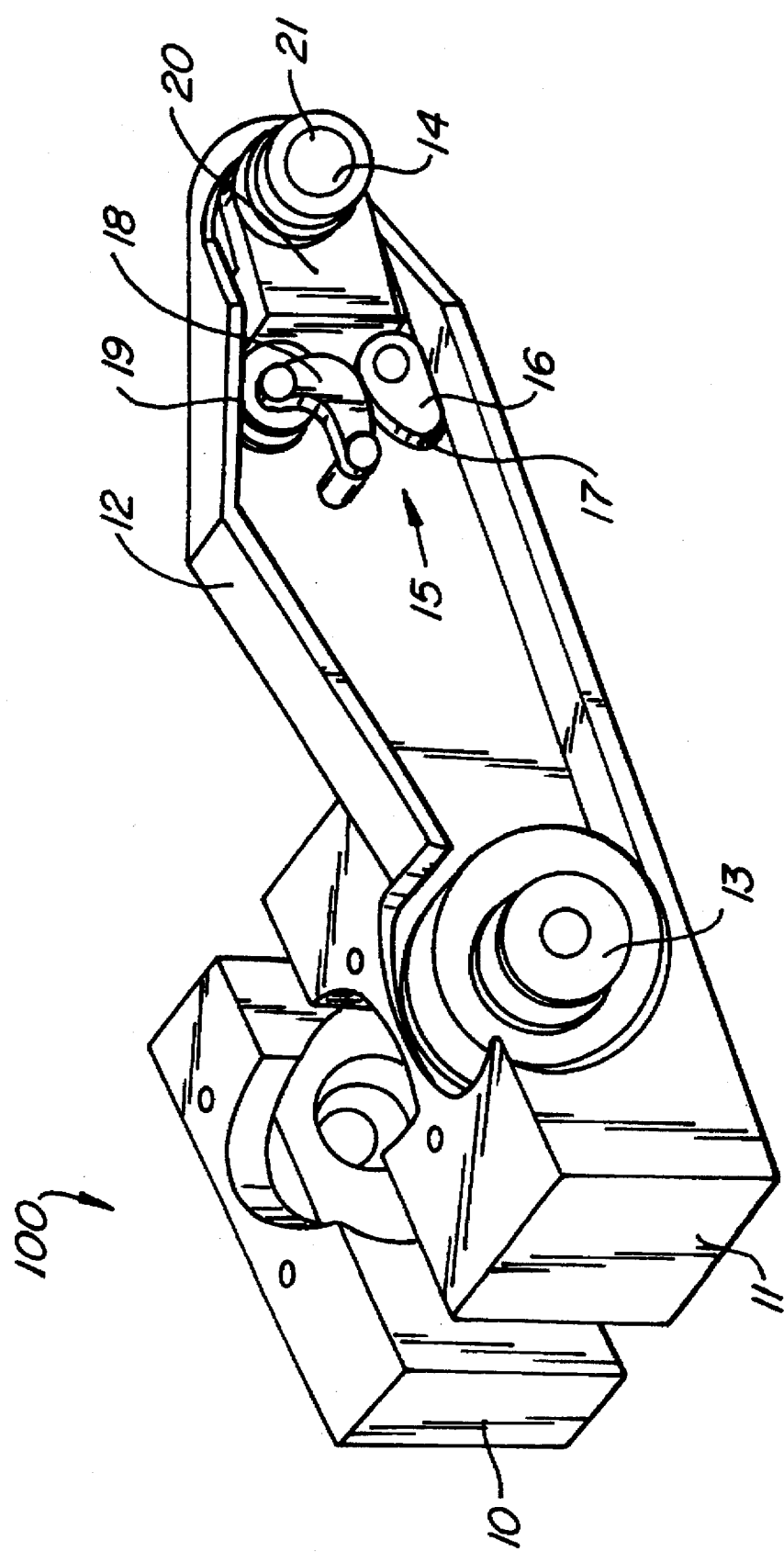
FIG. 1 shows a perspective view of a cutting-off machine without traction means and cutting disk.

Motor or engine-driven portable cutting-off machines are known in principle from the state of the art and possess a motor or engine drive unit that is mounted in a closed casing, on which a non-depicted handle and a control grip as well as a forwardly projecting arm are disposed. The cutting-off machines may be equipped with an electromotor or a gasoline engine. The motor or engine moves a drive shaft which is designed in the form of a power transmission shaft for atraction means which is driven and tightened with the aid of a second transmission shaft disposed at the end of the arm. In the present case, the housing 100 is comprised of two shells 10 and 11, of which the second shell 11 is of one-piece construction with the arm 12. Between the first power transmission shaft 13 driven by the motor direct and the second power transmission shaft 14, the non-depicted traction means, e.g. a V-belt (28 in FIG. 2) is tightened with the aid of a tightening means 15. This tightening means 15 is comprised of an eccentric 16 rotatably secured to the arm, which can be actuated by means of a hand tool, for instance an Allen key. This eccentric 16 possesses an external curve 17 which acts upon a lever arm rocker 18, which, at its end, carries a roller 19 which acts upon the non-depicted traction means. The block 20 disposed on the end of the arm 12 carries the transmission shaft 14 with a bore 21 as accommodation for a pin 25 (see FIG. 2), which, on the one hand, is detachably connectable with the transmission shaft 14 and, on the other hand, with a cutting disk 22.

Figure 2:
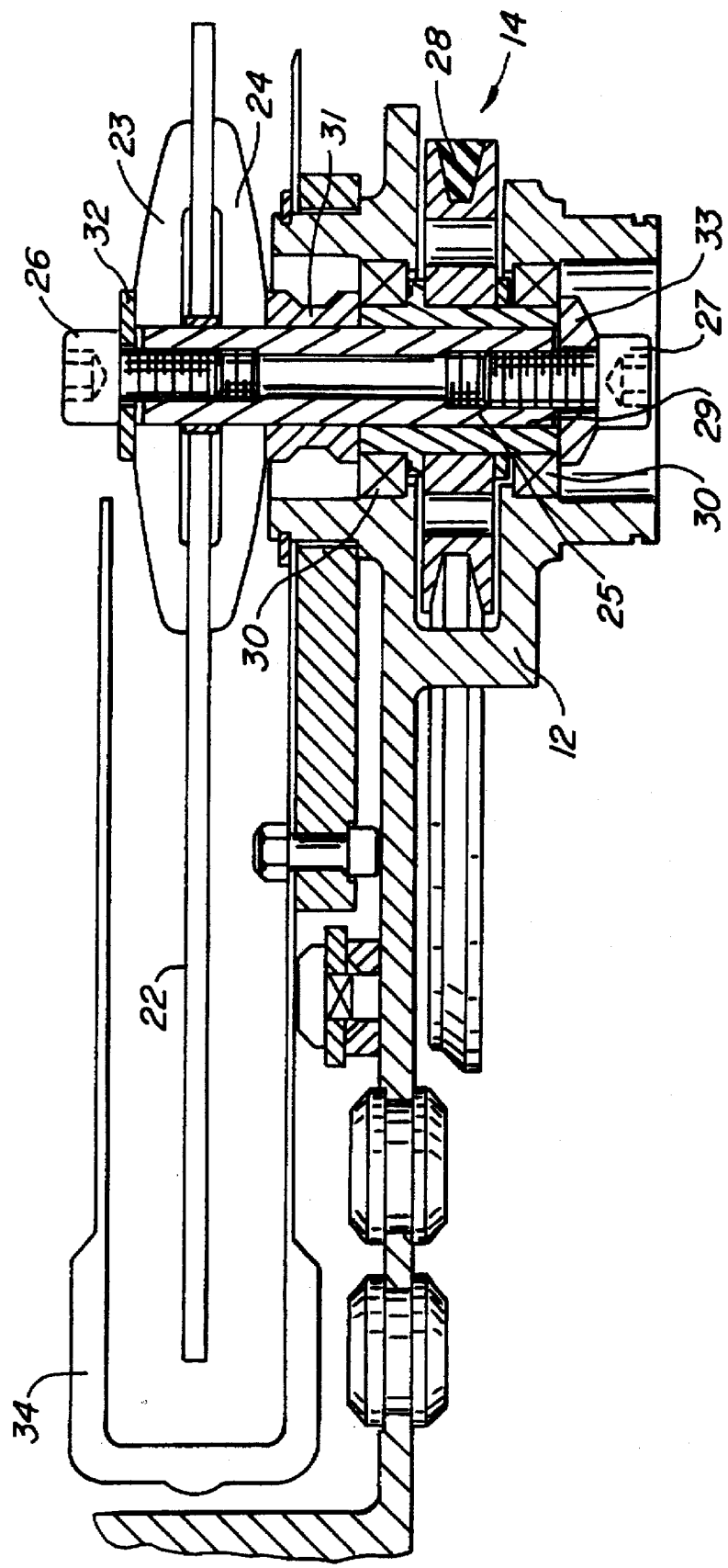
FIG. 2 shows a horizontal sectional representation through a part of this machine with mounted parting-off device.

As can be gathered in detail from FIG. 2, the cutting disk 22 is attached on a pin 25 and is, between two retaining shells 23 and 24, with the aid of two bolts 26 and 27, via the pin 25, connected with the transmission shaft 14, across which a V-belt 28 is stretched. The pin 25 is hereby inserted through a bore 29 of the transmission shaft 14 and secured there frictonally or rigidly connected. By means of the clamping connection of the pin 25 with the transmission shaft 14, which is rotatably retained in two bearings 30 and by means of the non-rotatable connection of the pin 25 with the cutting disk 22, the transmission shaft 14, when rotationally driven by means of the V-belt 28 as traction means, entrains the cutting disk 22. For any possible longitudinal compensations, a spacer 31 can be attached to the pin 25. Standard fitting disks or washers are identified with 32 and 33.

A safety hood 34 is connected with the arm 12 as carrier of the power transmission shaft 14, which is detachably mounted on the arm and which partly covers the cutting disk in the upward direction.

When the cutting disk has to be replaced or be shifted from the (upper) position illustrated in FIG. 2 into an opposite (lower) position, then the bolts 26 and 27 are detached, the pin 25 is extracted together with the cutting disk 22 and inserted from the other, opposite side and bolted down once more with the bolts 26 and 27. Since the position of the transmission shaft 14 remains unchanged in this resetting operation, a retightening of the V-belt 28 is not necessary either.

Should the V-belt 28 have to be retightened or replaced, then, with the aid of a box spanner, the eccentric 16 is turned against the force of a spring, whereby the roller 19 is relieved of the load and swung back by means of the rocker arm 18. In order to prevent that, subsequent to the relaxation, the eccentric 16, driven by the spring force, is not urged into the tightening position again, on the eccentric curve 17 of the latter, a cam or toe may be provided which lockingly engages into a pertinently configured recess of the rocker arm 18. By means of this engaged position, the eccentric 16 remains in the relaxed traction means position until the traction means is aligned once more for tightening. The eccentric curve 17 is designed in such a way that, with the continuing elongation of the traction means, while allowance is made for the changing geometry of the traction means as well as for the changing spring force acting upon the eccentric 16, a constant tension in the traction means is ensured and also that, by virtue of its geometry, the tightening means is secured against a return movement by the traction means.

LIST OF REFERENCE NUMBERS

| | |
|---|---|
| Housing | 100 |
| shells | 10, 11 |
| arm | 12 |
| (power) transmision shaft | 14 |
| tightening means | 15 |
| eccentric | 16 |
| curve | 17 |
| rocker arm | 18 |
| roller | 19 |
| block | 20 |
| bore | 21 |
| cutting disk | 22 |
| retaining shells | 23, 24 |
| pin | 25 |
| bolts | 26, 27 |
| V-belt | 28 |
| bore | 29 |
| bearing | 30 |
| fitting disks 6 washers | 32, 33 |
| safety hood | 34. |

What is claimed is:

1. A portable cutting machine comprising:

first and second, spaced, power transmission shafts drivingly coupled to each other, the first shaft adapted for coupling to a motor;

a cutting tool coupled to the second transmission shaft such that rotation of the first shaft by the motor rotates the second shaft and the cutting tool therewith;

an integral, single-piece housing having a base portion and an arm extending therefrom, the first shaft being coupled to the base portion and the second shaft being coupled to the arm; and wherein the second shaft defines a central bore, the machine further comprising a pin extending into the bore and non-rotatably coupled to the second shaft and the cutting tool for rotating the cutting tool with the first shaft.

2. The cutting machine of claim 1 wherein the single-piece housing comprises a material selected from the group consisting essentially of plastic and metal.

3. The cutting machine of claim 1 further comprising an endless element drivingly coupling the first shaft to the second shaft, the endless element exerting a tension force on the first and second shafts.

4. The cutting machine of claim 3, wherein the tightening assembly acts directly upon the endless element.

5. The cutting machine of claim 3 wherein the endless element elongates with time, the machine further comprising a tightening assembly coupled to the endless element to automatically maintain the tension force substantially the same as the endless element elongates.

6. The cutting machine of claim 5 wherein the tightening assembly comprises a lever arm rocker subjected to a spring force and having a roller acting against the endless element, and an eccentric camming lever rotatably coupled to the arm, the camming lever acting against the lever arm rocker.

7. The cutting machine of claim 3 wherein the endless element is a V-belt.

8. The cutting machine of claim 3 wherein the endless element is a chain.

9. The cutting machine of claim 1 further comprising a safety hood at least partially covering the cutting tool, the safety hood being removably mounted to the arm.

10. The cutting machine of claim 1 wherein the cutting tool is selected from the group consisting essentially of a sawblade and a cutting disk.

\* \* \* \* \*